（12）United States Patent
Liu et al.

(10) Patent No.: US 9,032,154 B2
(45) Date of Patent: May 12, 2015

(54) INTEGRATION OF SECURE DATA TRANSFER APPLICATIONS FOR GENERIC IO DEVICES (75) Inventors: Xian Jun Liu, San Jose, CA (US); Robert C. Chang, Danville, CA (US); Po Yuan, Milpitas, CA (US); Junzhi Wang, San Jose, CA (US); Ron Barzilai, Kfar-Vradim (IL); Bahman Qawami, San Jose, CA (US); Farshid Sabet-Sharghi, Los Altos Hills, CA (US)

(73) Assignee: SanDisk Technologies Inc., Plano, TX (US)

( * ) Notice: Subject to any disclaimer, the term of this patent is extended or adjusted under 35 U.S.C. 154(b) by 1573 days.

(21) Appl. No.: 11/956,042

(22) Filed: Dec. 13, 2007

(65) Prior Publication Data

US 2009/0157971 A1  Jun. 18, 2009

(51) Int. Cl.
G06F 13/00 (2006.01)
G06F 12/00 (2006.01)
G06F 12/08 (2006.01)

(52) U.S. Cl.
CPC ........ *G06F 12/0886* (2013.01); *G06F 12/0804* (2013.01); *G06F 12/0871* (2013.01); *G06F 12/0891* (2013.01); *G06F 2212/1004* (2013.01); *G06F 2212/1032* (2013.01); *G06F 2212/2146* (2013.01); *G06F 2212/462* (2013.01)

(58) Field of Classification Search
None
See application file for complete search history.

(56) References Cited

U.S. PATENT DOCUMENTS

| 4,634,807 | A | | 1/1987 | Chorley et al. |
| 4,992,931 | A | * | 2/1991 | Hirasawa ..................... 710/66 |
| 5,450,489 | A | | 9/1995 | Ostrover et al. |
| 5,530,235 | A | | 6/1996 | Stefik et al. |

(Continued)

FOREIGN PATENT DOCUMENTS

| DE | 19820479 A1 | 12/1999 |
| EP | 1209574 A | 5/2002 |

(Continued)

OTHER PUBLICATIONS

Notification of Transmittal of the International Search Report and the Written Opinion of the International Searching Authority, or the Declaration for International Application No. PCT/US2008/086168 mailed Mar. 16, 2009, 15 pages.

(Continued)

*Primary Examiner* — Sean D Rossiter
(74) *Attorney, Agent, or Firm* — Davis Wright Tremaine LLP (57) ABSTRACT

Techniques are presented for sending an application instruction from a hosting digital appliance to a portable medium, where the instruction is structured as one or more units whose size is a first size, or number of bytes. After flushing the contents of a cache, the instruction is written to the cache, where the cache is structured as logical blocks having a size that is a second size that is larger (in terms of number of bytes) than the first size. In writing the instruction (having a command part and, possibly, a data part), the start of the instruction is aligned with one of the logical block boundaries in the cache and the instruction is padded out with dummy data so that it fills an integral number of the cache blocks. When a response from a portable device to an instruction is received at a hosting digital appliance, the cache is similarly flushed prior to receiving the response. The response is then stored to align with a logical block boundary of the cache.

19 Claims, 5 Drawing Sheets

(56) References Cited

U.S. PATENT DOCUMENTS

| | | | |
|---|---|---|---|
| 5,581,743 A * | 12/1996 | Burton et al. | 703/26 |
| 5,689,702 A * | 11/1997 | Bulusu | 1/1 |
| 5,715,403 A | 2/1998 | Stefik | |
| 5,847,698 A | 12/1998 | Reavey et al. | |
| 5,887,269 A | 3/1999 | Brunts et al. | |
| 5,897,663 A | 4/1999 | Stancil | |
| 5,956,034 A | 9/1999 | Sachs et al. | |
| 5,982,891 A | 11/1999 | Ginter et al. | |
| 5,991,399 A | 11/1999 | Graunke et al. | |
| 6,009,525 A | 12/1999 | Horstmann | |
| 6,055,314 A | 4/2000 | Spies et al. | |
| 6,073,226 A | 6/2000 | Cutshall et al. | |
| 6,191,712 B1 * | 2/2001 | Still | 341/95 |
| 6,226,618 B1 | 5/2001 | Downs et al. | |
| 6,240,506 B1 * | 5/2001 | Miller | 712/213 |
| 6,247,097 B1 * | 6/2001 | Sinharoy | 711/125 |
| 6,314,409 B2 | 11/2001 | Schneck et al. | |
| 6,317,809 B1 * | 11/2001 | Kulakowski et al. | 711/112 |
| 6,317,812 B1 | 11/2001 | Stai | |
| 6,363,437 B1 | 3/2002 | Sassi | |
| 6,385,677 B1 | 5/2002 | Yao | |
| 6,418,421 B1 | 7/2002 | Hurtado et al. | |
| 6,438,638 B1 | 8/2002 | Jones et al. | |
| 6,460,116 B1 * | 10/2002 | Mahalingaiah | 711/125 |
| 6,502,146 B1 | 12/2002 | Rasmussen et al. | |
| 6,529,949 B1 | 3/2003 | Getsin et al. | |
| 6,546,193 B1 | 4/2003 | Um et al. | |
| 6,550,011 B1 | 4/2003 | Sims, III | |
| 6,611,358 B1 | 8/2003 | Narayanaswamy | |
| 6,697,944 B1 | 2/2004 | Jones et al. | |
| 6,738,614 B1 | 5/2004 | Blankenship et al. | |
| 6,738,905 B1 | 5/2004 | Kravitz et al. | |
| 6,742,109 B2 * | 5/2004 | Sokolov et al. | 712/210 |
| 6,745,267 B2 | 6/2004 | Chen et al. | |
| 6,757,749 B2 | 6/2004 | Aoki et al. | |
| 6,813,725 B1 | 11/2004 | Hanes et al. | |
| 6,824,051 B2 | 11/2004 | Reddy et al. | |
| 6,876,984 B2 | 4/2005 | Tadayon et al. | |
| 6,886,036 B1 | 4/2005 | Santamaki et al. | |
| 6,907,585 B2 | 6/2005 | Kohno | |
| 6,922,725 B2 | 7/2005 | Lamming et al. | |
| 6,944,600 B2 | 9/2005 | Stefik et al. | |
| 6,973,445 B2 | 12/2005 | Tadayon et al. | |
| 6,974,076 B1 | 12/2005 | Siegel | |
| 6,983,367 B2 | 1/2006 | Go et al. | |
| 7,023,572 B2 | 4/2006 | Tuli | |
| 7,068,381 B1 | 6/2006 | Tuli | |
| 7,068,387 B2 | 6/2006 | Ahne et al. | |
| 7,237,046 B2 | 6/2007 | Paley et al. | |
| 2001/0013021 A1 | 8/2001 | Saito | |
| 2002/0099955 A1 | 7/2002 | Peled et al. | |
| 2002/0112172 A1 | 8/2002 | Simmons | |
| 2002/0152172 A1 | 10/2002 | Hars et al. | |
| 2002/0162009 A1 | 10/2002 | Shmueli et al. | |
| 2002/0184156 A1 | 12/2002 | Tadayon et al. | |
| 2002/0185533 A1 | 12/2002 | Shieh et al. | |
| 2002/0196364 A1 | 12/2002 | Hendricks | |
| 2003/0018582 A1 | 1/2003 | Yaacovi | |
| 2003/0093598 A1 | 5/2003 | Park | |
| 2003/0167236 A1 | 9/2003 | Stefik et al. | |
| 2003/0225765 A1 | 12/2003 | Frieden et al. | |
| 2003/0233501 A1 | 12/2003 | Ma et al. | |
| 2004/0035939 A1 | 2/2004 | Lin | |
| 2004/0039932 A1 | 2/2004 | Elazar et al. | |
| 2004/0064612 A1 | 4/2004 | Pinto et al. | |
| 2004/0093509 A1 | 5/2004 | Elazar et al. | |
| 2004/0137664 A1 | 7/2004 | Elazar et al. | |
| 2004/0193744 A1 | 9/2004 | Paley et al. | |
| 2004/0205453 A1 | 10/2004 | Mortensen | |
| 2004/0210433 A1 | 10/2004 | Elazar et al. | |
| 2005/0004875 A1 | 1/2005 | Kontio et al. | |
| 2005/0015549 A1 * | 1/2005 | Dierks et al. | 711/118 |
| 2005/0042930 A1 | 2/2005 | Harkabi et al. | |
| 2005/0044330 A1 | 2/2005 | Elazar et al. | |
| 2005/0061873 A1 | 3/2005 | Pirillo | |
| 2005/0138551 A1 | 6/2005 | Elazar et al. | |
| 2005/0149450 A1 | 7/2005 | Stefik et al. | |
| 2005/0195635 A1 * | 9/2005 | Conley et al. | 365/149 |
| 2005/0230483 A1 | 10/2005 | Miller et al. | |
| 2005/0230484 A1 | 10/2005 | Cuellar et al. | |
| 2005/0251617 A1 | 11/2005 | Sinclair et al. | |
| 2005/0289072 A1 | 12/2005 | Sabharwal | |
| 2006/0010500 A1 | 1/2006 | Elazar et al. | |
| 2006/0080535 A1 | 4/2006 | Elazar et al. | |
| 2006/0084287 A1 | 4/2006 | Miller et al. | |
| 2006/0136656 A1 * | 6/2006 | Conley et al. | 711/103 |
| 2006/0294289 A1 * | 12/2006 | Ashmore | 711/100 |
| 2007/0070842 A1 * | 3/2007 | Hwang et al. | 369/47.27 |
| 2007/0186032 A1 * | 8/2007 | Sinclair et al. | 711/103 |
| 2007/0214326 A1 * | 9/2007 | Oka et al. | 711/154 |
| 2008/0065552 A1 | 3/2008 | Elazar et al. | |
| 2008/0065911 A1 | 3/2008 | Elazar et al. | |
| 2008/0209109 A1 * | 8/2008 | Lasser | 711/103 |

FOREIGN PATENT DOCUMENTS

| | | |
|---|---|---|
| EP | 1304665 A2 | 4/2003 |
| EP | 1 376 309 A | 1/2004 |
| GB | 2367925 A | 4/2002 |
| TW | 200715797 A | 4/2007 |
| WO | WO 98/42098 A1 | 9/1998 |
| WO | WO 01/69354 A2 | 9/2001 |
| WO | WO 01/69354 A3 | 9/2001 |
| WO | WO 01/69354 A4 | 9/2001 |
| WO | WO 01/93000 A2 | 12/2001 |
| WO | 2004/031935 A3 | 4/2004 |
| WO | WO 2004/086363 A2 | 7/2004 |
| WO | 2006/057991 A1 | 11/2005 |
| WO | WO 2005/116819 | 12/2005 |
| WO | WO 2006/110213 A2 | 10/2006 |
| WO | WO 2007/076214 | 7/2007 |

OTHER PUBLICATIONS

Kim et al., Object-Oriented Concepts, Databases, and Applications, New York, New York: ACM Press, 1989, ISBN 0-201-14410-7, pp. 4-5.

Comer, et al., "Operating System Design," Englewood Cliffs, New Jersey: Prentice Hall, 1989, pp. 308-309.

"Sandisk BookLocker aka FlashCP DRM/Based USB Stick," Cohn Dunstan & Flauzon, Internet Article, Jun. 29, 2005, 1 page.

"BookLocker," SanDisk, Internet Article, Feb. 6, 2005, XP002484733, 1 page.

"Sandisk Frees Students from Heavy Backpacks," Press Release (Online), Jun. 28, 2005, 1 page.

"Sandisk Introduces Ultra II SD Plus, a Dual-Purpose SD Memory Card with Built-In USB Connectivity," Press Release (Online), Feb. 19, 2005, XP002484735, 1 page.

PCT International Search Report mailed Mar. 19, 2004, International Application No. PCT/US03/25921, 4 pages.

Humer, Caroline, "Students Set to Hit the Latest E-Books," http://msnbc.com/id/4846005/, Apr. 27, 2004, 5 pages.

SanDisk Secure Content Solutions, Inc., "BookLocker™ Secure Digital Books," Product Description, 2005, 4 pages.

Edited by Bill Cope and Robin Freeman, "Digital Rights Management and Content Development: Technology Drivers Across the Book Production Chain, from Creator to Consumer," RMIT University, 2001, whole book (pp. v.-166).

Lesley Ellen Harris, "Digital Property Currency of the 21$^{st}$ Century," published McGraw-Hill Ryerson Ltd, 1998, whole book (pp. vi-230).

National Research Council, "The Digital Dilemma, Intellectual Property Rights and the Emerging Information Infrastructure," National Academy Press, Washington D.C., 2000, whole book (pp. v-340).

Lawrence Lessig, "The Future of Ideas," Random House 2001, whole book (pp. vii-352).

Carol Risher, "Technological Protection Measures (Anti-Circumvention Devices) and Their Relation to Exceptions to Copyright in the Electronic Environment," http://www.ipa-uie.org/events/bookfairs/fbf2000/crisher.html, Oct. 20, 2000, 6 pages.

(56) References Cited

OTHER PUBLICATIONS

Mike Godwin, "A Cop in Every Computer," IP Worldwide, http://www.law.com, Jan. 14, 2002, 5 pages.
Mark Walter et al., "DRM: 'Down-Right Messy' and Getting Worse," The Seybold Report, Analyzing Publishing Technologies, vol. 1, No. 3, pp. 5-15.
Renato Iannella, "Digital Rights Management (DRM) Architectures," D-Lib Magazine, vol. 7, No. 6, Jun. 2001, 10 pages.
Joshua Duhl et al., "Understanding DRM Systems—An IDC Whitepaper," www.idc.com, pp. 1-25.
Patricia Evans, "DRM: Is the Road to Adoption Fraught With Potholes?" The Seybold Report, vol. 1, No. 14, Oct. 22, 2001, pp. 1-3.
Richard Eoin Nash, "A Tale of Two E-media Hosts," http://www.hostingtech.com/sp/02_06_sp_tale_print.html, Jun. 2002, pp. 1-3.
Dennis Fowler, "Digital Rights (and Wrongs)," NW, Jun. 2002, pp. 26-31.
Bill Pearson, Technical Marketing Engineer, "Digital Transmission Content Protection," presented Jun. 16, 1999 at Intel Corporation, pp. 1-25.
Jaehong Park et al., "Towards Usage Control Models: Beyond Traditional Access Control," SACMAT'02, Jun. 3-4, 2002, Monterey, CA, pp. 57-64.
Ingemar J. Cox, "Watermarking and Digital Rights Management," NEC Research Institute, Princeton, NJ, Mar. 20, 2001, pp. 1-14.
Eric Knorr, "Content Rights and Wrongs," http://Techupdate.zdnet.com, Dec. 4, 2001, pp. 1-2. Tech Update, Dec. 4, 2001, pp. 1-2.
Mark Stamp, "Digital Rights Management: The Technology Behind the Hype (Draft)," Jun. 6, 2002, pp. 1-15.
Bill Trippe, "XrML and Emerging Models of Content Development and Distribution," The Gilbane Report, Apr. 23, 2002, pp. 1-16.
Mark Walter, "Authentica, Alchemedia Apply DRM to Corporate Intellectual Property," The Seybold Report, vol. 1, No. 12, Sep. 17, 2001, pp. 1-4.
Nic Garnett, "Digital Rights Management, Copyright, and Napster," Jun. 2001, pp. 1-5.
Nic Garnett and Tomas Sander, "Fair Use by Design—Session 3: What DRM can and cannot do and what it is or isn't doing today," $12^{th}$ Conference on Computers, Freedom & Privacy, San Francisco, Apr. 16-19, 2002, 6 pages.
Joshua Duhl, "Sony Licenses InterTrust's DRM: What Does It Mean?" IDCFlash, Jun. 2002, pp. 1-4.
Dr. John Manferdelli, "Digital Rights Management("DRM")" Unified DRM Group, Microsoft Corporation, Symposium on Embeded Security, 2001, pp. 1-26.
Martha Nalebuff, "Publisher's Dilemma," Unified DRM Core at Microsoft Corporation, Seybold, Apr. 10, 2001, pp. 1-6.
Amy Carroll et al., "Microsoft Palladium: A Business Overview," Microsoft Content Security Business Unit, Jun. 2002, pp. 1-9.
Gordon Lyon, "The Internet Marketplace and DRM," Convergent Information Systems Division, NIST, Jul. 12, 2001, pp. 1-12.
Michael Calvert, "Content Management—Timetable for Digital Rights Management," InSide Gartner This Week, No. 2, Jul. 18, 2001, pp. 1-3.
Kim Zwollo, "Digital Document Delivery and Digital Rights Management," IOS Press, 2001, pp. 9-11.
Olin Sibert, "Digital Rights Management: The Future Is Secure Hardware," Electronic Design, vol. 48, i10, May 15, 2000, p. 56.
Info-Tech Advisor Newsletter, "Digital Rights Management 101," Jun. 26, 2001, pp. 1-2.
"Fair Usage Definition Called Key to Digital Rights Management," Communications Daily, v 22, i25, Feb. 6, 2002, pp. 1-2.
"Lack of DRM Standards Impeding Broadband Demand," Audio Week, v. 13, i51, Dec. 24, 2001, pp. 1-2.

Linden deCarmo, Media Alert—New Digital Rights Technologies Protect Content Creators' Interests, but What About Users' Rights? PC Magazine, Jun. 26, 2001, pp. 1-5, 80.
Harvey Ardman, "Will DRM Make Digital Publishing More Profitable?" Seybold Seminars, Boston, Apr. 2001, pp. 1-2.
Susan Marks, "Staking Out Digital Rights; Digital Rights Management Software Addresses the Thorny E-Comm Problem of Sharing Content While Protecting Intellectual Property," Network World, Feb. 18, 2002, pp. 1-2, 70.
Robert Bolick, "Pricing Digital Content," Professional Book Group, The McGraw-Hill Companies, Mar. 11, 2001, pp. 1-8.
Yuval Levin, "Talking to ourselves," Liberzine.com, Sep. 6, 2000, pp. 1-3.
Clifford Lynch, "The Battle to Define the Future of the Book in the Digital World," First Monday, May 2001, pp. 1-49.
Richard Stallman, "The Right to Read," GNU Project—Free Software Foundation (FSF), Feb. 1997, pp. 1-5.
"The Digital Millennium Copyright Act of 1998," (DMCA) Pub. L. No. 105-304, 112 Stat. 2860, Dec. 1998, pp. 1-18.
"Doesn't Everybody Do It?—Internet Piracy Attitudes and Behaviors," A report on a survey conducted by SIIA and KPMG—Fall 2001, pp. 1-32.
"IIPA 2000-2001 Estimated Trade Losses Due to Copyright Piracy," International Intellectual Property Alliance (IIPA), Apr. 30, 2002, pp. 1-2.
Ipsos-NPD, "Briefing: The Online Book Marketplace," May 2001, 33 pages.
Terje Hillesund, "Will E-books Change the World?" First Monday, Sep. 14, 2001, pp. 1-21.
George Alexander et al., "The Road Ahead: Problems Facing the Publishing Industry Today," The Seybold Report, Apr. 22, 2002, vol. 2, No. 2, pp. 3-9.
John Markoff, "Fears of Misuse of Encryption System Are Voiced," New York Times, Jun. 20, 2002, pp. 1-3.
"Trusted Computing Platform Alliance (TCPA)," TCPA Design Philosophies and Concepts, Version 1.0, Copyright 2000 Compaq Computer Corporation, Hewlett-Packard Company, IBM Corporation, Intel Corporation, Microsoft Corporation, Jan. 25, 2001, V. 1.0 25, pp. 1-30.
Joshua Piven, "Tech vs. Tinseltown," Computer Technology Review, Los Angeles, May 2002, pp. 1-4.
"The Need for a Rights Language," Technical White Paper, Version 1.0, ContentGuard 2001, pp. 1-12.
"Extensible Rights Markup Language (XrML) 2.0 Specification," Part 1-Part V, ContentGuard, Nov. 20, 2001, 154 pages.
"Digital Rights Management for Ebooks: Publisher Requirements," Version 1.0, Association of American Publishers (AAP), Nov. 27, 2000, pp. 1-66.
USB Implementers Forum, "Universal Serial Bus Mass Storage Class, UFI Command Specification," Revision 1.0, Dec. 14, 1998, pp. 1-53.
EPO/ISA, "Notification of Transmittal of the International Search Report and the Written Opinion of the International Searching Authority, or the Declaration", mailed in related PCT/US2004/024166 on Jul. 25, 2005, 13 pages.
European Patent Office, "Substantive Examination," mailed in corresponding European Patent Application No. 04 779 294.0 on Aug. 9, 2006, 5 pages.
Communication Pursuant to Article 94(3) EPC for European Application No. 08 859 004.7 dated Feb. 6, 2012, 4 pages.
Taiwan Office Action for Application No. 097148609 dated Feb. 18, 2014, 5 pages.

* cited by examiner

| Byte Offset | Arg Length | Argument Name | Argument Type | Comments |
|---|---|---|---|---|
| 0-35 | 36 | Reserved for Card Transport Layer | Undefined | |
| 36 | 40 | Arguments Common to all TrustedFlash Commands | | This section is reserved for TrustedFlash secure session, version controls and other common arguments.<br><br>(can include field for dummy sector count) |
| 76 | 436 | Command Specific Arguments | | The specific argument section for specific commands, according to different command functionalities. |

INTEGRATION OF SECURE DATA TRANSFER APPLICATIONS FOR GENERIC IO DEVICES

FIELD OF THE INVENTION

This invention pertains generally to the field of using portable media, such as a secure memory card, with digital appliances, such as a telephone handset, and more particularly to techniques for transferring instructions between a digital appliance and a portable media in communication therewith.

BACKGROUND

Digital appliances, such as notebook or laptop computers, personal digital assistants (PDAs), or mobile phones, are commonly used with portable media, such as memory cards or USB drives. In some cases, secure data is stored on these portable media. The application responsible for securely transferring this data between the hosting appliance and the media often uses instructions that have a specific structure. As part of the transfer process, the host may cache the instruction; but as the host's operating system may unaware of the instruction's structure, and because the host's cache structure may not be compatible with the instruction's structure, the instruction, along with any associated data, may not be successfully transferred.

SUMMARY OF THE INVENTION

According to a one aspect, techniques are presented for sending an application instruction from a hosting digital appliance to a portable medium, where the instruction is structured as one or more units whose size is a first size, or number of bytes. After flushing the contents of a cache, the instruction is written to the cache, where the cache is structured as logical blocks having a size that is a second size that is larger (in terms of number of bytes) than the first size. In writing the instruction (having a command part and, possibly, a data part), the start of the instruction is aligned with one of the logical block boundaries in the cache and the instruction is padded out with dummy data so that it fills an integral number of the cache blocks.

According to another aspect, when a response from a portable device to an instruction is received at a hosting digital appliance, the cache is similarly flushed prior to receiving the response. The response is then stored to align with a logical block boundary of the cache.

Various aspects, advantages, features and embodiments of the present invention are included in the following description of exemplary examples thereof, which description should be taken in conjunction with the accompanying drawings. All patents, patent applications, articles, other publications, documents and things referenced herein are hereby incorporated herein by this reference in their entirety for all purposes. To the extent of any inconsistency or conflict in the definition or use of terms between any of the incorporated publications, documents or things and the present application, those of the present application shall prevail.

BRIEF DESCRIPTION OF THE DRAWINGS

The various aspects and features of the present invention may be better understood by examining the following figures, in which.

DETAILED DESCRIPTION

Introduction

When transferring content between a portable medium, such as a memory card, and a hosting digital appliance, such as mobile telephone handset, a host's operation system will often use a caching mechanism for the content. This cache will typically have a structure where it is logically broken up into a number of blocks of a particular size. The content being transferred, whether data or an instruction (a command and maybe some associated data), may also be structured in a specific way as one or more sections of a certain size. When the content is structure in units of one size (for example, as 512 Byte sectors) and the cache is structured in units of another size (for example, in 2 KB blocks), the caching mechanism may clash with the content's structural requirements.

This is particularly true with dealing with secure content and secure portable storage media, such as that marketed under the TrustedFlash name. In such cases, the more basic levels of a host's operating system that handle transfers between the host and the portable medium will see the instruction as just so much data, being unaware of any embedded commands in the instruction, and store it as such in cache. Examples of such instructions and their use are described in U.S. Pat. No. 7,237,046, U.S. patent application Ser. No. 10/899,260, and, particularly, U.S. patent application Ser. Nos. 11/298,349 and 11/299,186. Under such arrangements, the host's operating system may treat the instruction as data to be written to a particular address on the medium; but, when received on the medium, this instruction will be interpreted as, for example, a write command to store data at different address on the medium. If the host then tries to issue a read command for this data, the address as seen by the host's operating system will not correspond to the actual address as interpreted on the medium; and as the host may then rely what is thinks is cached copy of the data, it will incorrectly use this cached data.

The techniques described here are widely applicable, both for portable media, such as memory cards, that are primarily used with a hosting digital appliance, and also digital. appliances which themselves include non-volatile memory, such as embedded flash. Example of such digital appliances include desktop, notebook or laptop tablet computers, personal digital assistants (PDAS), mobile phone handsets, a variety of media players such as MP3 players, DVD players, gaming consoles, digital recording devices such as digital cameras, and others. Suitable portable media are available from SanDisk Corporation, the assignee hereof, which include those sold under trademarks TrustedFlash, Compact-Flash (CF), Multi-Media Card (MMC), Secure Digital (SD), MicroSD and Memory Stick PRO. These memory cards are removably connectable with digital appliances through mating connectors that are different thr most cards. Flash drives, sold as those sold under the Cruzer trademark, contain a plug according to the Universal Serial Bus (USB) standard, so can be plugged directly into any digital appliance having a USB receptacle. TrustedHash cards and other secure cards (SIM, SMMC, SD, etc) allow secure storage of the both licenses and associated content. Also the following discussion will often refer to non-volatile memory as flash, the techniques given here are not so limited and more generally apply to other non-volatile memory structures (such as described in US patent application Ser. No. 10/841,379, published as US Patent Application Publication number 2005/0251617. for example), for both portable devices and embedded memories. Although the teachings given here are not so limited, when reference is made to a particular embodiment flit purposes of discussion, the following will often refer to the concrete example of a mobile telephone handset used with a memory card, such as that of the TrustedFlash variety, having instructions whose structure is based on a sector.

To circumvent such possible difficulties with the host caching, firmware associated with the secure transfer can be changed to be aware of the running time command size; the associated application toolkit needs to be integrated with the applications; instructions sent from the application to the platform operation system (OS), including write and read commands, start with a cache block size aligned sector; and that the write, read buffer size should be cache block size aligned.

Technically, to allow fast spread out of secure content media to users of digital appliances, integration for these platforms with the corresponding secure content toolkit is important. Due to the special requirements of most secure content technology and code size consideration, the corresponding application toolkit usually needs to be integrated into the operating system (OS) of a handset or other hosting device, so that the applications can call the application programming interfaces (APIs) provided by the toolkit to access the media. However, for certain standardized or open platforms, say Linux and WIPI, this solution can be complicated to implement since it is not easy to have the needed platform modifications to support secure content media.

To overcome this limitation, every platform will provide a way for applications to access generic IO device; in case of a TrustedFlash card, this is the SD IO device. With this assumption, the applications can use the provided IO access to communicate with the secure content media card by integrating the corresponding toolkit into the applications. This can be used for any platforms, especially being good for those unmodified platforms, as long as the IO device is accessible for applications. The major difficulty of this solution is to deal with the caching mechanism, which is used most likely for every platform. The following section describes the nature of this caching mechanism, and the conflicts between its buffered IO and the earlier versions of secure content transfer firmware.

Problem of Buffered IO with Current Secure Transfer Firmware

As noted, many command and data transfer processes rely upon a particular structure for instructions. For example, current TrustedFlash firmware is defined to communicate with the handset or other host through sector (512 Bytes) based instructions. The number of sectors for each instruction is predefined. This can cause a major IO problem for buffered IO only platforms. Due to the hosting platform's caching mechanism, the instructions sent to TrustedFlash firmware on the media may not be sector based, so that the TrustedFlash communication channel is broken. For example, a TrustedFlash CREATE ACR command is a one-sector write instruction. When an application sends a one-sector write to the platform OS, this write command may be changed to a write command with multiple sectors, and the starting write location may be changed as well, after this command reaches the secure transfer firmware on the media.

A common scenario for write command is the following:
Application asks to write to the device n sectors on location $m^{th}$ sector.
The OS will check the cache for related memory location; if it does not exist, the OS will read data from a location on the card, including the required location, and then stores it on the cache.
The OS will update the related sector.
The OS may or may not flush the data back to the card right away.

Figure 1:
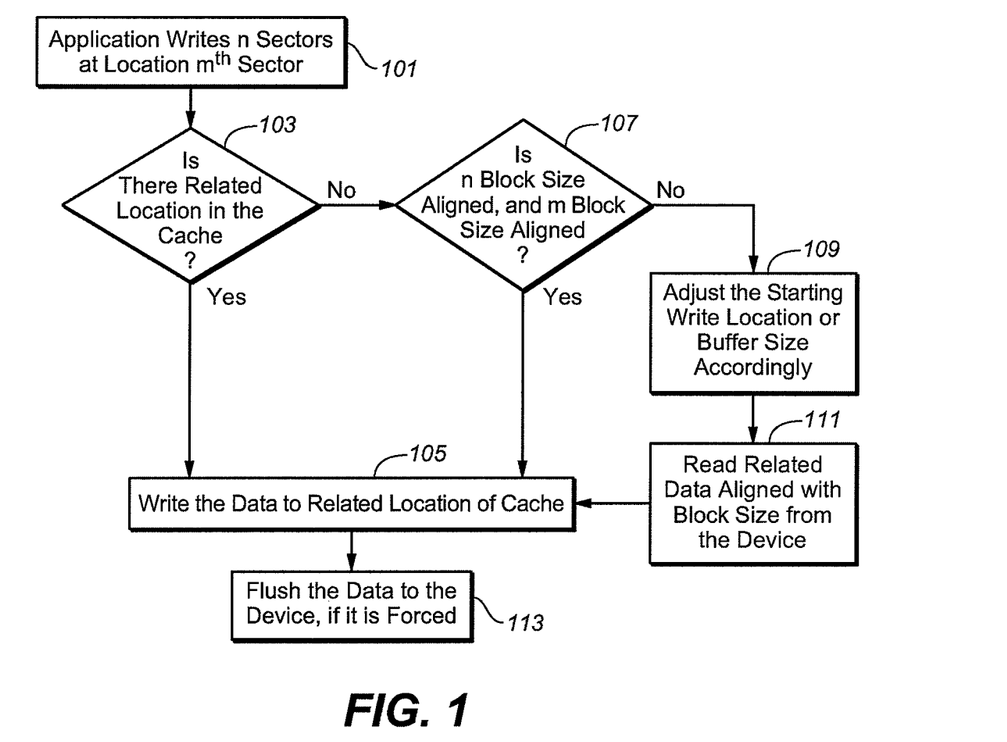
FIG. 1 is a flowchart of a common sequence for a write process with caching.

FIG. 1 is a flow chart to describe this common behavior for write command as seen by the host. It should again be noted that although the application may see the instruction as a command, possibly with data attached, to the operating system, it is just interpreted as data.

FIG. 1 starts at 101 with the application asking to write to the device. The cache is checked at 103 to determine whether a related location already exists in the cache; if so (the "Y" path), the data is written to the related location of the cache at 105. If a related cache location is not found (the "N" path out of 103), it is then determined whether the n (the number of sectors to write) is cache-block-size aligned, and m (the location for the write) is cache-block-size aligned at 107, and, if so, the process again goes to 105. The NO path out of 107 leads to 109, where the starting write location or buffer size buffer is adjusted as needed. For example, take the case of where the size of the cache blocks is 2 KB and the hosting application sends the instruction data with a total of n=5 sectors and which starts on the seventh sector (m=7). The host will change the starting on the fifth and the total sectors of data as 8. 109 then goes on to 111, where the related data aligned with the cache block size is read from the device, before going to 105. Finally, the OS may flush the data back to the card right if forced. As a result of this caching mechanism, the TrustedFlash firmware may not be able to understand whatever command sent from the applications.

In practice, some platforms support direct IO, while others only provide buffered IO. In addition, the caching algorithms may be different from platform to platform. Therefore, a generic solution is quite preferable for integration with secure transfer application's toolkit. The following discussion present such an integrated solution, based on the example for TrustedFlash, that works whether the host platform uses direct IO or buffered IO. This is presented below as including four components: the structure of system integration; the modification of firmware; and the methods of solving caching for write and for read.

Integrating Secure Transfer Toolkit into Applications

Since a platform remains the same, for the applications to access the secure content card, the corresponding toolkit will need to integrate into the host's applications so that they can call the toolkit APIs to send, say, TrustedFlash commands to the TrustedFlash cards. Briefly, the toolkit provides full package of APIs for applications to access the secure media. This package offers many functions related with secure system, such as system operation, account operation, storage operation, and digital rights management (DRM) operation.

The applications will directly call the toolkit's APIs, and then the toolkit will talk to the corresponding secure medium by using the device operation methods provided by the platform OS. For example, in Linux, this methods are open( ), read( ), write( ), and close( ). According to each individual platform, this glue layer between toolkit and the platform is implemented in the Platform I/O Device Operation.

Figure 2:
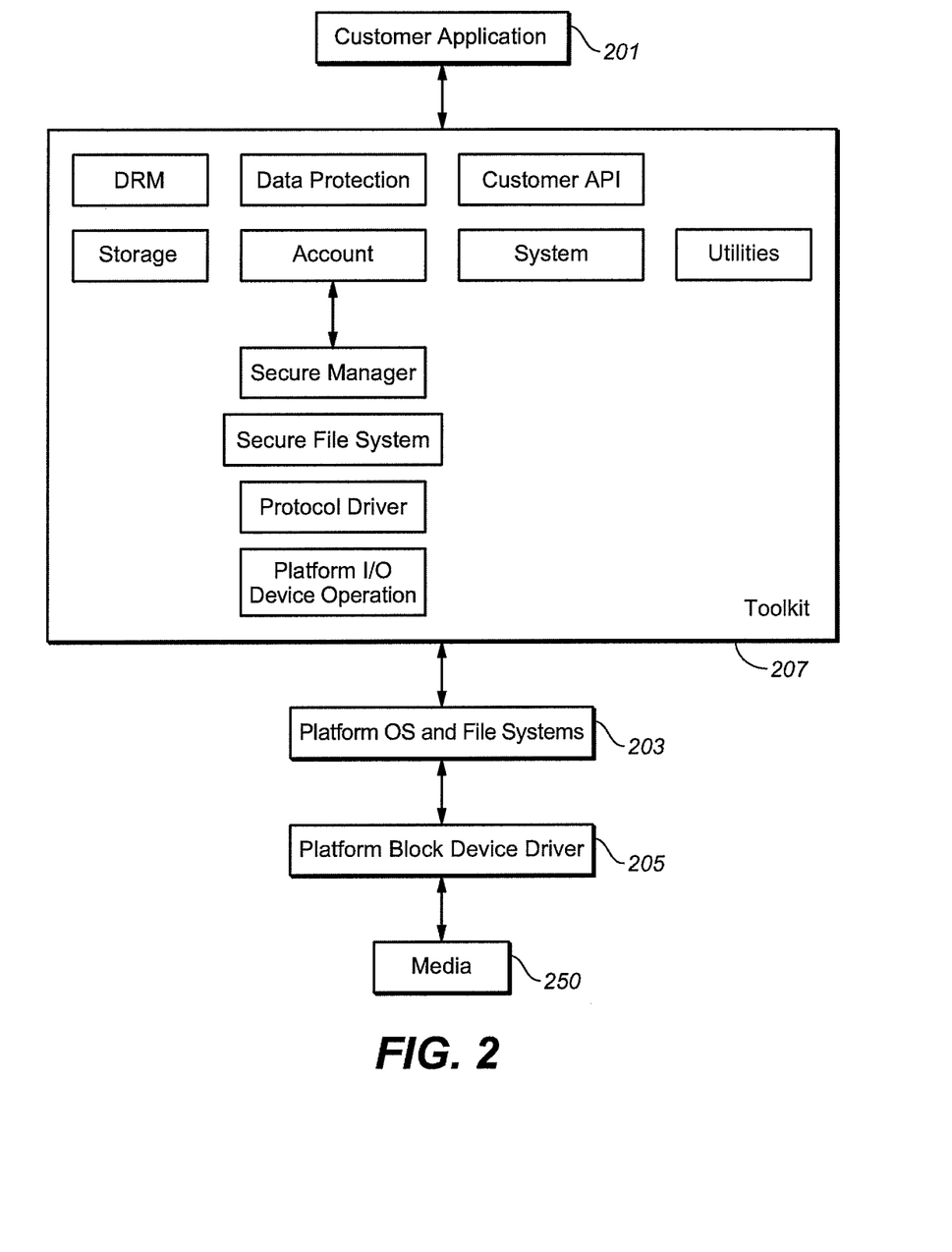
FIG. 2 is an application system diagram.

FIG. 2 gives a block diagram of the structure. On the host side, the layer shown include the various customer applications 201 on the top, under which is the platform's operating system and file systems 203, and then the platform's block device driver 205 which is used to communicate with the portable medium 250. The toolkit 207 will then be between the customer application layer 201 and the operation system and file systems layers. As shown in FIG. 2, among the elements that can be included in the toolkit are digital rights management (DRM), data protection, customer APIs, storage, account, system, and utility blocks, as well the secure manager, secure file system, protocol driver, and platform I/O device operation sub-layers.

The Modification of Secure Firmware

Figure 3:
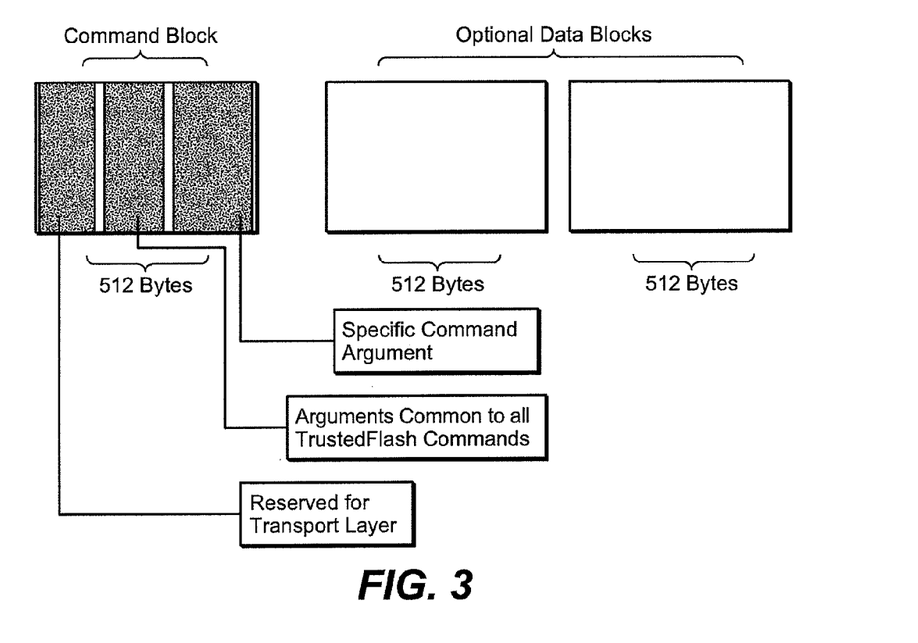
FIG. 3 shows an example of a command structure.
Figure 4:
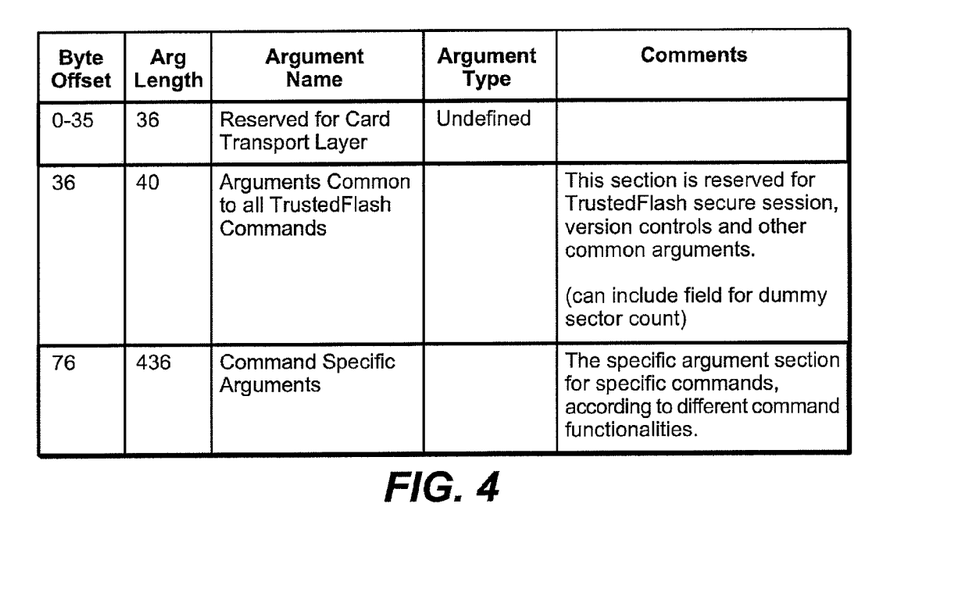
FIG. 4 is a table showing an example of a command structure.

As discussed above, the instructions used in secure data protocols are often based on units of a particular number of bits. For example, the TrustedFlash instructions for communicating between a host and the TrustedFlash firmware on media are sector-based. The number of sectors for each instruction is predefined during the firmware loading. FIG. 3 and table of FIG. 4 show the TrustedFlash command structure as found in the TrustedFlash specification.

As shown in FIG. 3, and as is developed further in U.S. patent application Ser. Nos. 11/298,349 and 11/299,186, the exemplary instruction is composed of a first sector (512 Bytes) that holds the command. After this command block follows any associated sectors of data, again structured as sectors. For example, a write instruction for N sectors of data would consist of N+1 sectors, a first for the write command followed by the data sectors. For commands without data, such as a status request, would just be the one sector of the command block. Any response, such as the data of a read command, would be treated by the read process of the last section below. The table of FIG. 4 illustrates some details for the exemplary command block structure in the TrustedFlash protocol.

Figure 5:
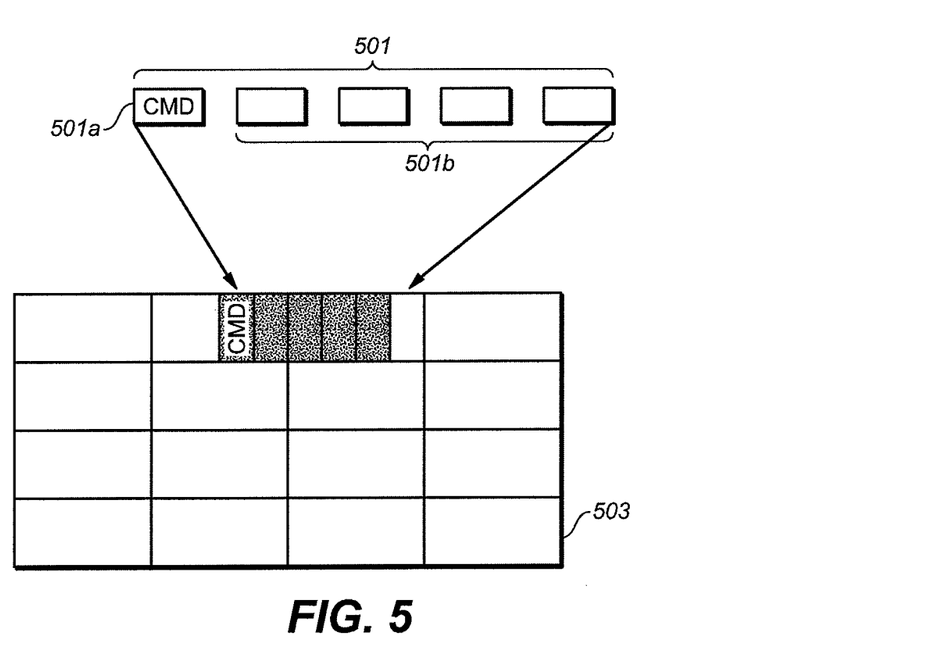
FIG. 5 illustrates the caching of an instruction, such as is shown in FIG. 3, where the instruction does not like up with a cache boundary.

FIG. 5 schematically illustrates the sort of misalignment that can occur under the prior art arrangement when an instruction based on units of a first size is written into a cache based on logical blocks of a different size. For this example, the instruction 501 is take to be made up of 5 sector-sized units, where the first sector 501a is the command portion and there are four sectors 501b of associated data. The cache 503 is structure in terms of 2 KB (or, more accurately 2048 Byte) blocks. (It will typically be the case that the size of the blocks used in the cache will be some multiple of a standard sector.) Without the sort of arrangements discussed below, the instruction could be cached at a arbitrary location in the cache as shown in FIG. 5, with the resultant problems described above.

In order to make the media firmware understood the commands from platforms with buffered IO, the current firmware preferably knows the dynamical command size of each commands. To do so, one field can be introduced to add into the command block to specify the total size of current sending command. For example, in the table of FIG. 4, a new field for the dummy sector count can be added into the second portion of the command sector beginning at byte 36. The predefined command lengths will be treated as the default values, and this field will tell the actual size of this command in run time. If this field is 0, then the default values will be used.

Figure 6:
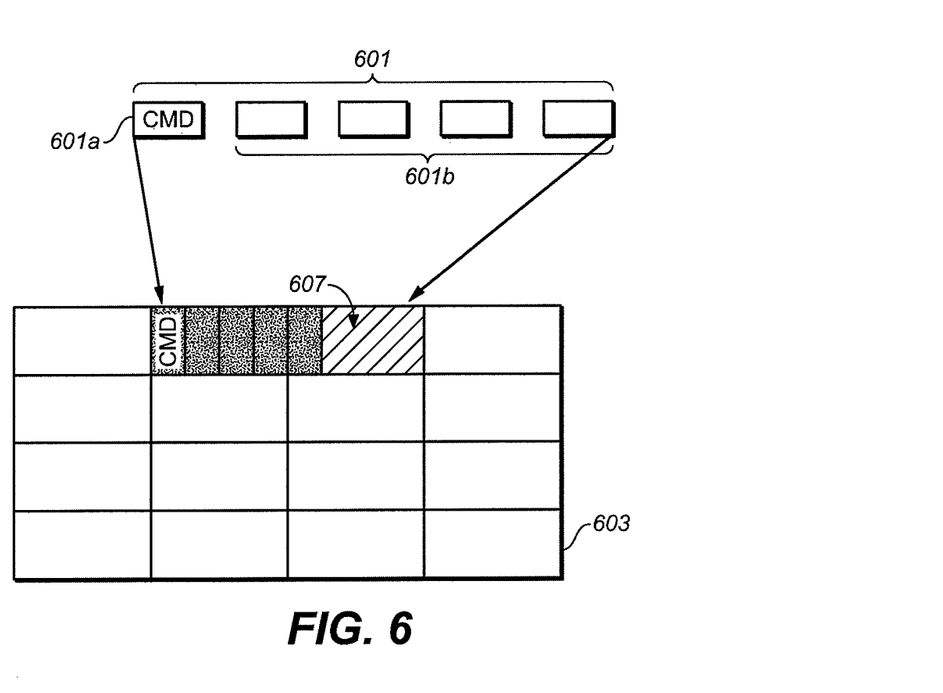
FIG. 6 illustrates the caching of an instruction, such as is shown in FIG. 3, where the instruction is aligned with a cache boundary and padded out.

When a platform OS is using buffered IO, the behaviors for both read and write may be changed as described below. The following two sections describe the way to deal with the caching on write, when an instruction is sent to the medium, and read, when a response is returned. Briefly, this process is illustrated in FIG. 6, which is similarly numbered to FIG. 5, except as shown in FIG. 6, the instruction is now aligned with a logical block boundary in the cache and any partially filled cache blocks are then padded out as shown by the hatched area 607.

Method of Direct Write Command for Buffered IO

The secure transfer firmware is the agent inside the media (e.g., TrustedFlash) card to handle the commands. The secure transfer commands from the host are preferably sent to the card immediately. Therefore, if the platform OS does not send a write command to the card, but puts the data into the buffer instead, the medium will have no way to get the command and respond to it. In addition, for instructions structured with the command block required to be in a specific locations, as with the TrustedFlash command block that must be the first sector of the whole command, the sequence of the write command must follow the appropriate (e.g. TrustedFlash) protocol; any extra reads or writes in the command sequence before command completion, including get command status, will cause problems to firmware, so that the command will not succeed. Below is the method to solve these problems one by one.

The method of forcing the OS to flush write command is the following:

Close the device

Reopen the device

Some platforms may provide a function of flushing for write, in which case the corresponding command can be used. In others that lack such a command, or where flushing may not be working, the medium can be logically closed and reopened. To ensure the write command is flushed into the card, close-reopen always works.

Generally, when a card is inserted to the host, the host will initialize and mount the media/card. To access the contents of the media, it will open the media. It is considered as "logical" open. Related data, table, cache, and so on are established. After that, you can browse the directories, or open "file" for read/write operation. By "closing" the media, all cache contents, tables or data are cleared or invalidated. For example, the Linux operating system includes an open( ) command and a close( ) command. The close( ) command closes a file descriptor of the media so that it no longer refers to any file and may be used. Any record locks held on the file descriptor it was associated with, and owned with the process are removed. To logically reopen the device, a call to open( ) will create a new open file description. (These are described further in the Linux programmers manual.)

The other problem is the potential change of write location, write buffer size, and command sequence. To avoid these, the toolkit will send to the medium a command in the following way:

Be aware of the cache block size of particular platform

Set the starting sector of write command aligned with the cache block size

Make the buffer aligned with the cache block size, giving the correct size of the sending command.

This way, the OS does not need to adjust this write command since everything is cache-block-size aligned, and it does not need to read data form the card since the buffer size is block size aligned. As a result, the write command from the host will not be modified. If a platform supports direct IO, this method can still apply by simply setting the block size as 512 bytes.

Figure 7:
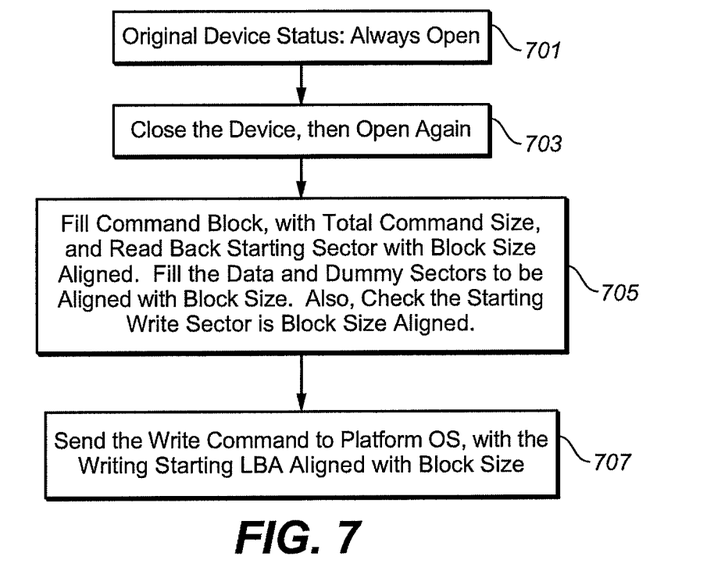
FIG. 7 illustrates a method of placing an instruction into cache.

The flow chart of FIG. 7 describes this method of write command. The flow begins at 701 with the original status of the medium being open. The cache is then flushed at 703 by logically closing the device and then reopening it. Alternately, if the operating system has a specific command to flush the cache, this can be used instead.

The instruction is then placed in the flushed cache at block 705. As shown in FIG. 6, the instruction 601 (including command block 601a and, in this example, four sectors of data) is stored so that it is aligned with a logical boundary in the cache 603. If this leaves any cache blocks only partially filled, these are then padded out to maintain the instruction as an integral number of logical blocks in the cache. In this example, as each logical block in the cache can hold 4 sectors, and the instruction has 5 sectors, when the instruction is contiguously cached, the last sector of the instruction only occupies part of a cache block. The hatching at 607 represents the added padded so that the host's operating system thinks the instruction is formed of complete cache blocks and treats it as such.

Returning to FIG. 7, as shown in block 705, this process can include the command block being filled with the total size of the actual instruction or command and reading back the starting sector with the cache's logical block size aligned. The data, including any dummy sectors to fill out a complete cache block, are then filled. The starting write sector can then be checked to confirm the block alignment of the instruction. At block 707, the write command to send this instruction to the media can then be sent to the platform's operating system, where the write process will now start with the logical block address (LBA) that aligns with the cache's block boundaries and size.

Methods to Deal with Caching for IO Read

After receiving an instruction form the host, the medium may need to respond to the host, such as with a status or with data in response to a read request. Because of caching, whenever the application send a read command, the OS may just go to the cache to read it back if the related location data is in the cache. Therefore, the actual firmware response is not returned back to the application.

To deal with this problem, cache bypass can be used in the following way:

- The read relative staring logical block address (LBA) for each TrustedFlash command changes for every read.
- The difference of starting read LBA between two read commands should be bigger that the cache block size.
- The starting read LBA should be aligned with cache block size.
- Close and reopen the device to make sure the OS flushing the read for application. If a platform supports direct IO, this method can still apply by simply setting the cache block size as 512 bytes. The flow chart of FIG. 8 describes this method of read command.

Figure 8:
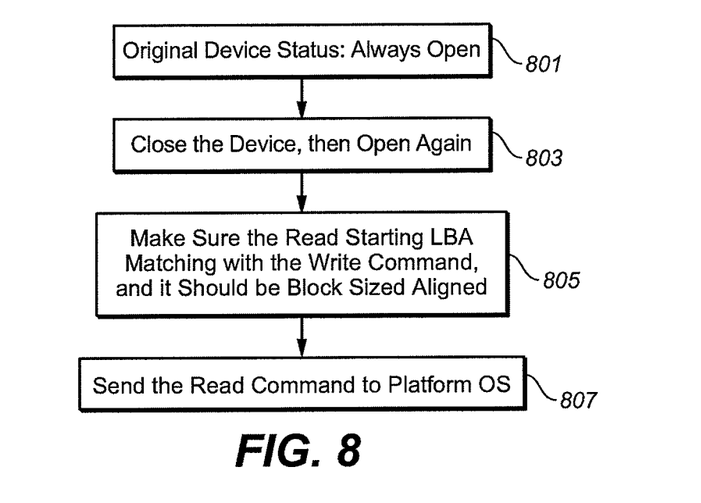
FIG. 8 illustrates a method of placing a response into the host's cache.

FIG. 8 shows an exemplary embodiment for allowing the medium to respond to an instruction from the host. Typically, this read process will immediately follow the write process described in the last section, with no other commands being inserted between the write instruction and the read command. The flow again begins with the original device status being open, block 801.

At 803, the cache is flushed as at 703, with a close and then open or, if available, with a command to flush the cache. As the cache is now emptied, this prevents the operating system from just returning cached material instead of the actual response from the medium. At 805, the alignment is checked to see that when the received response is placed in the cache, it will be aligned with the logical block structure of the cache. Finally, the read command is sent to the platform's operating system.

Once these preparations have been made, the driver can then send the read instruction to the medium, which will then return the response. As noted, this may include actual secure user data (that, data as seen be the secure transfer system) or a non-data response, such as a status. The response is then cached aligned with the logical block boundaries of the cache. Padding, which secure transfer application would then ignore, may also be added to fill out an integral number of cache blocks.

Although the invention has been described with reference to particular embodiments, the description is only an example of the invention's application and should not be taken as a limitation. Consequently, various adaptations and combinations of features of the embodiments disclosed are within the scope of the invention as encompassed by the following claims.

It is claimed:

1. A method of sending an application instruction from a hosting digital appliance to a detachable non-volatile memory system connected thereto, the non-volatile memory system including one or more non-volatile memory circuits and a controller circuit by which the application instruction is to be executed, wherein the application instruction is structured as one or more units whose size is a first number of bytes, the method comprising:
   flushing the contents of a cache on the hosting digital appliance;
   subsequently writing the application instruction to the cache on the hosting digital appliance, where the cache on the hosting digital appliance is structured as a plurality of logical blocks whose size is a second number of bytes, the second number being greater than the first number, the writing including:
      aligning the start of the application instruction with a boundary of the logical blocks; and
      padding the application instruction with dummy data to have a size which is an integer multiple of the second number of bytes; and
   subsequently sending the application instruction from the cache on the hosting digital appliance to the non-volatile memory system.

2. The method of claim 1, wherein the second number is an integer multiple of the first number.

3. The method of claim 1, wherein the size of said units is a sector.

4. The method of claim 1, wherein the application instruction includes a command portion and data portion.

5. The method of claim 4, wherein the command is a write command for storing the data portion in the non-volatile memory system.

6. The method of claim 4, wherein the command portion is one of said units in size and the data portion is one or more of said units in size.

7. The method of claim 1, wherein the application instruction does not include a data portion.

8. The method of claim 7, wherein the application instruction comprises a read data command.

9. The method of claim 8, further comprising:
   in response to the application instruction, returning data from the non-volatile memory system to the hosting digital appliance.

10. The method of claim 9, further comprising:
storing the returned data in the cache on the hosting digital appliance, including aligning the start of the data with a boundary of the logical blocks.

11. The method of claim 7, further comprising:
storing a response to the application instruction in the cache on the hosting digital appliance, wherein the response to the application instruction is structured as one or more units whose size is the first number of bytes and the storing includes aligning the start of the response with a boundary of the logical blocks.

12. The method of claim 1, wherein flushing the contents of the cache on the hosting digital appliance comprises:
closing by the hosting digital appliance of the non-volatile memory system; and
subsequently opening by the hosting digital appliance of the non-volatile memory system.

13. A method of receiving at a hosting digital appliance a response to an application instruction issued by the digital appliance from a controller circuit of a detachable non-volatile memory system connected thereto, Where the non-volatile memory system includes one or more non-volatile memory circuits and the controller circuit and wherein the response is structured as one or more units whose size is a first number of bytes, the method comprising:
issuing the application instruction from the hosting digital appliance to the non-volatile memory system;
flushing the contents of a cache on the hosting digital appliance, where the cache on the hosting appliance is structured as a plurality of logical blocks whose size is a second number of bytes, the second number being greater than the first number;
subsequently receiving the response from the controller circuit to the application instruction on the hosting digital appliance; and
storing the response from the controller circuit in the cache on the hosting digital appliance, the storing including:
aligning the start of the response with a boundary of the logical blocks.

14. The method of claim 13, wherein the second number is an integer multiple of the first number.

15. The method of claim 13, wherein the storing further includes:
padding the response with dummy data to have a size Which is an integer multiple of the second number of bytes.

16. The method of claim 13, wherein the application instruction includes a read command and the response includes data.

17. The method of claim 13, wherein the response is a status.

18. The method of claim 13, wherein flushing the contents of the cache on the hosting digital appliance comprises:
closing by the hosting digital appliance of the non-volatile memory system; and
subsequently opening by the hosting digital appliance of the non-volatile memory system.

19. The method of claim 13, wherein the size of said units is a sector.

* * * * *